US012796690B2

(12) United States Patent
Li

(10) Patent No.: US 12,796,690 B2
(45) Date of Patent: Nov. 17, 2026

(54) METHOD FOR PREPARING MULTIFUNCTIONAL COMPOSITE MODIFIED MASTERBATCH

(71) Applicant: Shanghai Huzheng Industry Co., Ltd, Shanghai (CN)

(72) Inventor: Jiayi Li, Shanghai (CN)

(73) Assignee: Shanghai Huzheng Industry Co., Ltd., Shanghai (CN)

(*) Notice: Subject to any disclaimer, the term of this patent is extended or adjusted under 35 U.S.C. 154(b) by 0 days.

(21) Appl. No.: 18/708,563

(22) PCT Filed: Apr. 28, 2023

(86) PCT No.: PCT/CN2023/091433
§ 371 (c)(1),
(2) Date: May 8, 2024

(87) PCT Pub. No.: WO2024/187559
PCT Pub. Date: Sep. 19, 2024

(65) Prior Publication Data

US 2026/0157375 A1 Jun. 11, 2026

(30) Foreign Application Priority Data

Mar. 13, 2023 (CN) ......................... 202310234298.1

(51) Int. Cl.

| | |
|---|---|
| ***A01N 59/16*** | (2006.01) |
| ***A01N 25/24*** | (2006.01) |
| ***C09D 7/40*** | (2018.01) |
| ***C09D 7/61*** | (2018.01) |
| ***C09D 7/63*** | (2018.01) |
| ***C09D 7/80*** | (2018.01) |

(52) U.S. Cl.
CPC ............. *A01N 59/16* (2013.01); *A01N 25/24* (2013.01); *C09D 7/61* (2018.01); *C09D 7/63* (2018.01); *C09D 7/70* (2018.01); *C09D 7/80* (2018.01)

(58) Field of Classification Search
CPC .......... A01N 59/16; A01N 25/24; C09D 7/61; C09D 7/63; C09D 7/70; C09D 7/80
See application file for complete search history.

(56) References Cited

U.S. PATENT DOCUMENTS

2003/0162011 A1* 8/2003 Imahashi ................ B32B 27/20 428/323
2010/0221969 A1 9/2010 Chen et al.

FOREIGN PATENT DOCUMENTS

| | | | | | |
|---|---|---|---|---|---|
| CN | 101182655 | A | | 5/2008 | |
| CN | 101586267 | A | | 11/2009 | |
| CN | 103289298 | A | | 9/2013 | |
| CN | 106835725 | A | | 6/2017 | |
| CN | 106977751 | A | | 7/2017 | |
| CN | 108301237 | A | | 7/2018 | |
| CN | 105830263 | B | * | 9/2018 | ............ H01M 4/131 |
| CN | 111205488 | A | | 5/2020 | |
| CN | 111979594 | A | | 11/2020 | |
| CN | 112608497 | A | | 4/2021 | |
| CN | 113321868 | A | * | 8/2021 | .............. C08J 3/226 |
| CN | 114775092 | A | | 7/2022 | |
| CN | 115182172 | A | * | 10/2022 | ........... D06N 3/0063 |

OTHER PUBLICATIONS

GB National Standards of the People's Republic of China with English Translation, GB/T 30128-2013, Published: Dec. 17, 2013, Put into Effect: Dec. 1, 2014.
GB National Standards of the People's Republic of China with English Translation, GB/T 30127-2013, Published: Apr. 29, 2008, Put into Effect: Dec. 1, 2014.
GB National Standards of the People's Republic of China with English Translation, GB/T 20944.3-2008, Published: Apr. 29, 2008, Put into Effect: Dec. 1, 2008.
PCT Search Report, Int. Application No. PCT/CN2023/091433, Int. Filing Date: Apr. 28, 2023, Applicant: Shanghai Huzheng Industry Co. Ltd.

* cited by examiner

*Primary Examiner* — Robert A Wax
*Assistant Examiner* — Ngoc-Anh Thi Nguyen
(74) *Attorney, Agent, or Firm* — Reising Ethington P.C.

(57) ABSTRACT

Provided is a method for preparing a multifunctional composite modified masterbatch, including: (1) preparation of a composition A including a far-infrared negative ion-carried carrier resin; (2) preparation of a surface-modified antibacterial nano-powder B; (3) preparation of a compound resin C with a compound flame-retardant function; and (4) preparation of the multifunctional composite modified masterbatch.

9 Claims, 1 Drawing Sheet

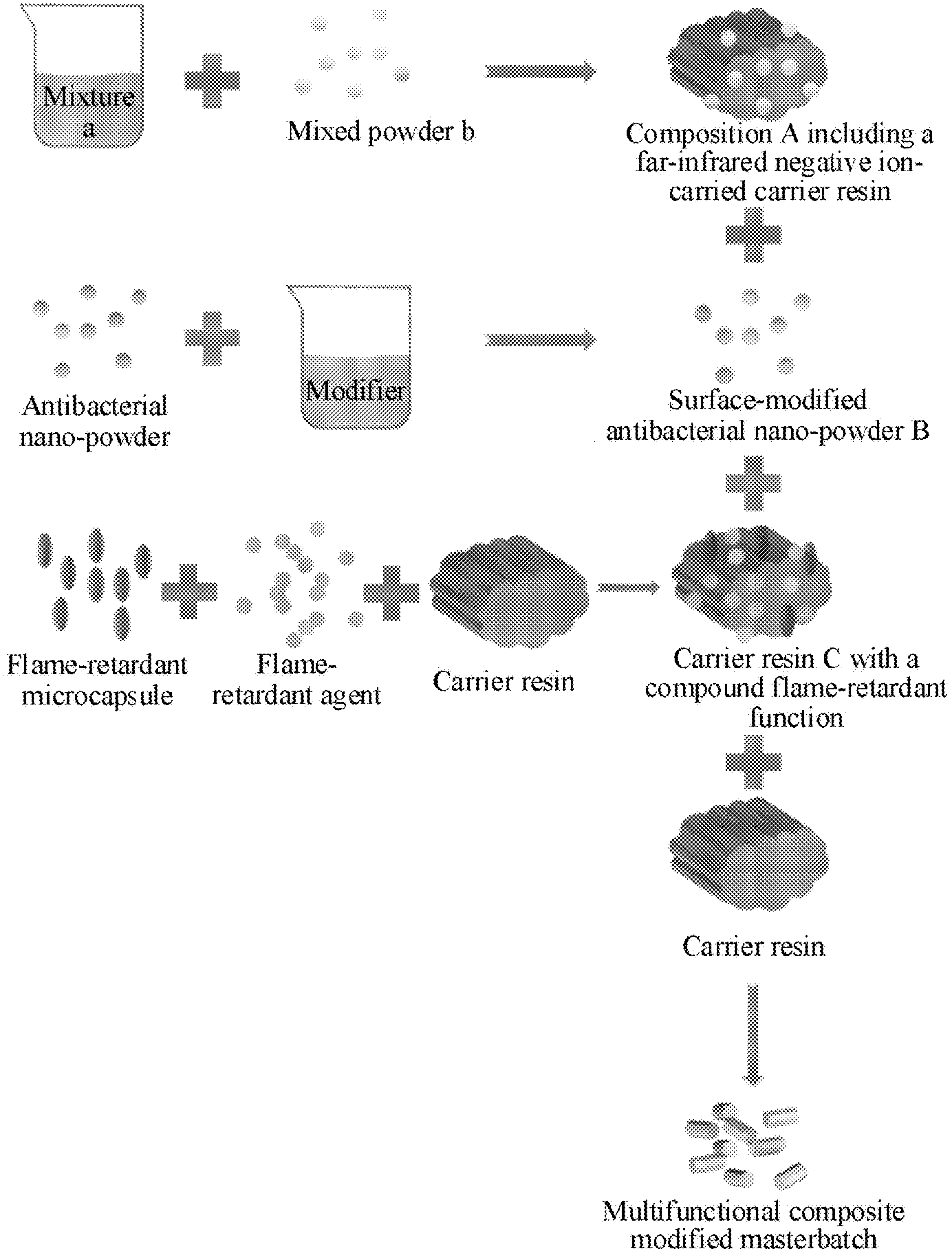
Mixture a
Mixed powder b
Composition A including a far-infrared negative ion-carried carrier resin
Antibacterial nano-powder
Modifier
Surface-modified antibacterial nano-powder B
Flame-retardant microcapsule
Flame-retardant agent
Carrier resin
Carrier resin C with a compound flame-retardant function
Carrier resin
Multifunctional composite modified masterbatch

METHOD FOR PREPARING MULTIFUNCTIONAL COMPOSITE MODIFIED MASTERBATCH

CROSS REFERENCE TO RELATED APPLICATION

The present application is a national stage application of International Patent Application No. PCT/CN2023/091433, filed on Apr. 28, 2023, which claims priority to the Chinese Patent Application CN202310234298.1 filed to the China National Intellectual Property Administration (CNIPA) on Mar. 13, 2023 and entitled "METHOD FOR PREPARING MULTIFUNCTIONAL COMPOSITE MODIFIED MASTERBATCH". The disclosure of the two patent applications is incorporated by references in their entireties.

TECHNICAL FIELD

The present disclosure belongs to the field of textiles, and relates to a method for preparing a multifunctional composite modified masterbatch.

BACKGROUND

With the technological development and social progress, people's living standards are improved, ordinary textiles can no longer meet the market needs, and people's requirements for health, functionality, and safety of textiles gradually increase. In particular, since the epidemic, demands for antibacterial fabrics and many novel fiber materials with health care functions have been increasing.

Most of the antibacterial fabrics on the market are produced through low-cost finishing. The finishing has a remarkable effect but poor durability, and dye waste liquids of the finishing cause unavoidable defects such as environmental pollution, which not only reduces the market competitiveness, but also may cause trade disputes. The current surface modification can well improve the binding performance between an antibacterial agent and a polymer carrier, for example, in a method for preparing an antibacterial and deodorizing composite masterbatch and fiber in a Chinese patent CN106977751A disclosed on Jul. 25, 2017, a modified tetraamminecopper (II) sulfate is added. This modification technique is expected to play an important role on the future antibacterial masterbatch and fiber market.

Novel fiber materials with health care functions such as far-infrared emission and negative ion release also appear on the market, and these fiber materials are produced by adding corresponding functional particles to fibers and subjecting modified fibers to spinning and braiding. In order to enrich functions of textiles, fabrics each with a variety of functional particles appear, for example, in a multifunctional fabric with far-infrared emission and negative ion release functions in a Chinese patent CN108301237A disclosed on Jul. 20, 2018, a stone needle powder and a tourmaline powder are added. In this case, a dispersing agent is often added to make functional particles evenly dispersed in a textile, and the dispersing agent is essentially an ionic surfactant. Due to different ionic properties of functional particles, to a multifunctional particle-dispersed system, adding a single dispersing agent often results in a limited dispersing effect, and simultaneously adding a variety of dispersing agents may cause a reaction with functional particles to some extent. Therefore, in the field of functional textiles, the dispersion and uniformity of functional powders in a process for preparing a functional masterbatch have always been technical problems.

Fabrics are combustible materials in fire disasters, and the safety of fabrics is a design blind spot that is easily ignored. Flame-retardant principles are mainly divided into the following four types: condensed phase flame retardant, free radical capture, cooling, and non-flammable gases. In many products, no flame-retardant agent or a flame-retardant agent with only one flame-retardant principle is added in consideration of cost saving, which is difficult to actually allow a flame-retardant effect. Only when flame-retardant agents with different flame-retardant principles are used in combination to play a synergistic role, an excellent flame-retardant effect can be obtained. For example, an antimony-halogen composite principle is to add a free radical capture material to a non-flammable gas system.

Therefore, combining the desirable benefits of a surface modification technique, a microencapsulation technique, a loading technique, and a material compounding technique to efficiently prepare a functional composite masterbatch with excellent health-care, antibacterial, and flame-retardant functions is still an urgent technical barrier in the art, which allows the preparation of a multifunctional composite masterbatch while avoiding the use of a dispersing agent and the environmental pollution.

SUMMARY

In view of the defects of the existing methods and the above-mentioned techniques, the present disclosure is intended to provide a method for preparing a multifunctional composite modified masterbatch that efficiently combines a surface modification technique, a microencapsulation technique, and a loading technique, and the method has desirable benefits such as high added value, no environmental pollution, efficient and long-term antibacterial activity, excellent dispersibility, no dispersing agent, and excellent flame-retardant and smoke-suppressant performance.

To achieve the above object, the present disclosure provides the following technical solutions:

The present disclosure provides a method for preparing a multifunctional composite modified masterbatch, including the following steps:

(1) preparation of a composition A including a far-infrared negative ion-carried carrier resin;

(2) preparation of a surface-modified antibacterial nanopowder B;

(3) preparation of a compound resin C with a compound flame-retardant function; and (4) preparation of the multifunctional composite modified masterbatch.

In some embodiments, step (1) specifically includes/consists of: mixing a carrier resin (50 wt % to 60 wt %), a curing agent (10 wt % to 20 wt %), and a solvent (30 wt % to 40 wt %) to be uniform to obtain a mixture a; preparing a stone needle-tourmaline mixed powder b with a particle size of 1 μm or less by using an ultrafine pulverizer; feeding the mixture a and the stone needle-tourmaline mixed powder b into a mixing device to obtain a homogeneous mixed slurry c; discharging and stirring the mixed slurry c at a certain heating temperature to obtain a concentrated slurry with a volume of 50% of an original volume; and subjecting the concentrated slurry to vacuum filtration to obtain a filter cake with a functional component content of 10% to 20%, and washing and drying the filter cake for later use.

In some embodiments, in step (1), the solvent is one selected from the group consisting of acetic acid, acetone, and ethylene glycol; the curing agent is one selected from the group consisting of diethylenetriamine, m-phenylenediamine, and aminoethylpiperazine; and the heating temperature is in a range of 50 °C to 110 °C.

In some embodiments, step (2) specifically includes/consists of: feeding an antibacterial nano-powder with a particle size of 10 nm to 100 nm into a high-speed kneading machine with a temperature of 70 °C to 120 °C and a rotational speed of 500 r/min, and adding a surface modifier at an amount of 5 wt % of the antibacterial nano-powder by a metering device; adjusting the temperature to 20 °C to 40 °C and the rotational speed to 1,500 r/min, and conducting high-speed mixing for 1 h; and reducing the rotational speed to 500 r/min, continuing mixing for 1 h, and discharging. The antibacterial nano-powder is one selected from the group consisting of nano-silver, nano-copper, and nano-zinc. The surface modifier is one selected from the group consisting of A151 (vinyltriethoxysilane), A171 (vinyltrimethoxysilane), and A172 (vinyltris(β-methoxyethoxy)silane).

In some embodiments, step (3) specifically includes/consists of: ball-milling diantimony trioxide and dibromomethane in a mass ratio of 1:1 dispersed in water to obtain a ball-milled material, centrifuging the ball-milled material, and drying a centrifuged material to obtain a core material; mixing the core material with hydrated zinc borate in a mass ratio of 1:3, adding absolute ethanol, and conducting reaction overnight at 50 °C to obtain a reaction product; centrifuging the reaction product to obtain a centrifuged product, and drying the centrifuged product to obtain an intermediate; adding the intermediate to an aqueous solution of sodium dodecyl sulfate heated at 60 °C, stirring at a rotational speed of 2,000 r/min for 20 min for emulsification to obtain an emulsion; adding ethanol at a mass of ⅓ of a mass of the emulsion to the emulsion, and adding ethyl silicate dropwise at a molar mass of 3 times a molar mass of the hydrated zinc borate to obtain a mixture; adjusting a pH of the mixture to 11, and naturally cooling to room temperature to obtain a cooled mixture; centrifuging the cooled mixture, and drying a centrifuged mixture to obtain the flame-retardant microcapsule; and mixing 2 parts to 4 parts of flame-retardant components (the flame-retardant microcapsule, aluminum hydroxide, and whitened red phosphorus) and 21 parts to 23 parts of a carrier resin to be uniform in a mixing device, and discharging.

In some embodiments, step (4) specifically includes/consists of: feeding the composition A, the antibacterial nano-powder B, the compound resin C, and a carrier resin into a twin-screw extruder according to a mass ratio of 10:10:20:23, and conducting extrusion and granulation at a processing temperature of 150 °C to 250 °C to obtain the multifunctional composite modified masterbatch.

In some embodiments, in steps (1), (3), and (4), the carrier resin is one selected from the group consisting of phenolic resin, polypropylene (PP), polyamide 6 (PA6), polyamide 66 (PA66), polyethylene terephthalate (PET), polyvinyl acetal, and polyurethane (PU), and a same carrier resin is used in steps (1), (3), and (4).

Compared with the prior art, the method for preparing a multifunctional composite modified masterbatch in the present disclosure includes preparations of three types of functional particles, i.e., a far-infrared negative ion-carried carrier resin, a surface-modified antibacterial powder, and a compound resin with a compound flame-retardant function, and granulation of a mixture of the three types of functional particles and a carrier resin to obtain a spinning-grade antibacterial flame-retardant masterbatch with a permanent far-infrared health care function. The carrier resin includes a phenolic fiber, nylon, terylene, a PP fiber, vinylon, or spandex, and can be widely used in textile-related fields such as clothing, shoe materials, non-woven fabrics, or home textiles. In the method of the present disclosure, functional composition particles are prepared separately, which avoids the use of a dispersing agent, involves simple operations with high universality, and is conducive to large-scale production. In addition, during granulation, there is excellent dispersibility and no agglomeration, which avoids dust and water pollution. The addition of a stone needle powder and a tourmaline powder into the composite product enhances the mechanical performance while providing a health care function. The modified antibacterial powder exhibits a high affinity for a polymer carrier. The compounding of the flame-retardant microcapsule and the flame-retardant agent allows the efficient and collaborative work of various flame-retardant principles.

Compared with the prior art, a flame-retardant system of the multifunctional composite modified masterbatch of the present disclosure includes the flame-retardant microcapsule, the flame-retardant agent, and the carrier resin, where under heat, a flame-retardant agent of aluminum hydroxide releases crystal water to absorb a large amount of heat and produces a heat-resistant metal oxidation product that can adsorb smoke particles, and a flame-retardant agent of whitened red phosphorus absorbs water to dehydrate the carrier resin into a carbon and produces a viscous substance to further isolate oxygen. A component of an inner layer of the flame-retardant microcapsule is hydrated zinc borate with high flame-retardant and antibacterial performance, and a core material is an antimony-halogen composite that combines the two flame-retardant principles of generating non-flammable gases and capturing free radicals. The flame-retardant system is composed of a variety of materials and exhibits high flame-retardant performance, and the design of the microcapsule reduces the mechanical performance loss and volatilization of materials and also reduces the mobility of active ingredients.

Compared with the prior art, the present disclosure has the following desirable benefits:

(1) The present disclosure involves a reasonable overall formula, simple devices, and basic operations, does not involve volatile solvents, dispersing agents, and follow-up steps such as recovery and recycling, and causes no hidden danger of environmental pollution.

(2) The techniques such as crushing, kneading, mixing, and extrusion used in the present disclosure are currently the mainstream techniques of the masterbatch industry, which have characteristics such as economy, convenience, and high efficiency and exhibit universality in subsequent mass production.

(3) The multifunctional composite modified masterbatch prepared by the present disclosure has excellent antibacterial, far-infrared health-care, and flame-retardant properties, and shows desirable benefits such as high added values, health-care performance, and safety in subsequent preparation and use of textiles.

(4) In the multifunctional composite modified masterbatch prepared by the present disclosure, components are evenly dispersed, function parameters of the components fluctuate little, and the performance of functional materials can be fully exerted, which is conducive to subsequent mass production and is not easy to cause after-sales problems.

BRIEF DESCRIPTION OF THE DRAWINGS

FIGURE shows a flow chart of the method for preparing a multifunctional composite modified masterbatch according to an embodiment of the present disclosure.

DETAILED DESCRIPTION OF THE EMBODIMENTS

The present disclosure will be further described below with reference to the flow chart shown in FIGURE and specific examples. These examples should be understood as merely illustrating the present disclosure rather than limiting the scope of the present disclosure. After reading the content of the present disclosure, technicians can make various changes or modifications to the present disclosure, and these equivalent changes and modifications shall also fall within the scope defined by the claims of the present disclosure.

Example 1

(1) Preparation of a Composition a Including a Far-Infrared Negative Ion-Carried Phenolic Resin:

50 g of phenolic resin, 30 g of diethylenetriamine, and 20 g of acetone were mixed to obtain a mixture a.

A stone needle-tourmaline mixed powder b with a particle size of 1 μm or less in which a mass ratio of a stone needle powder to a tourmaline powder was 1:1 was prepared by using an ultrafine pulverizer.

5 g of the mixed powder b was weighed and fed together with the mixture a into a mixing device to obtain a homogeneous mixed slurry c, and the homogeneous mixed slurry c was discharged, stirred at a heating temperature of 50 °C to obtain a concentrated slurry with a volume of 50% of an original volume. The concentrated slurry was subjected to vacuum filtration to obtain a filter cake with a functional component content of 10%, and the filter cake was washed and dried for later use.

(2) Preparation of a Surface-Modified Nano-Silver Powder B:

50 g of a nano-silver powder was fed into a high-speed kneading machine with a temperature set as 100 °C and a rotational speed set as 500 r/min, and 2.5 g of A151 (vinyltriethoxysilane) was added through a metering device; the temperature was adjusted to 30 °C and the rotational speed was adjusted to 1,500 r/min, and high-speed mixing was conducted for 1 h; and then the rotational speed was reduced to 500 r/min, the mixing was continued for another 1 h, and a product was discharged.

(3) Preparation of a Phenolic Resin C with a Compound Flame-Retardant Function:

5 g of diantimony trioxide and 5 g of dibromomethane dispersed in water were ball-milled to obtain a ball-milled material, and the ball-milled material was centrifuged at a rotational speed of 3,500 r/min, and then dried to obtain an antimony-halogen composite flame-retardant core material.

The core material was mixed with 30 g of hydrated zinc borate, an excess amount of absolute ethanol was added, and a resulting system was subjected to reaction overnight at 50 °C to obtain a reaction product; and the reaction product was centrifuged, and then dried to obtain an intermediate.

The intermediate was added to 600 mL of an aqueous solution of sodium dodecyl sulfate heated at 60 °C, and stirred at 2,000 r/min for 20 min for emulsification to obtain an emulsion. 200 mL of ethanol was added to the emulsion, and 4.79 g of ethyl silicate was added dropwise to obtain a mixture; a pH of the mixture was measured and adjusted to 11. The heating was stopped, and the mixture was naturally cooled to room temperature to obtain a cooled mixture; and the cooled mixture was centrifuged, and then dried to obtain a flame-retardant microcapsule for later use.

8 g of the flame-retardant microcapsule, 4 g of aluminum hydroxide, 4 g of whitened red phosphorus, and 84 g of a phenolic resin were fed into a mixing device, mixed to be uniform, and discharged to obtain the phenolic resin C with a compound flame-retardant function.

(4) Preparation of a Multifunctional Composite Modified Masterbatch:

50 g of the composition A, 50 g of the surface-modified nano-silver powder B, 100 g of the phenolic resin C, and 115 g of phenolic resin were fed into a twin-screw extruder, subjected to extrusion and granulation at a processing temperature of 175 °C, and a resulting material was dried to obtain the multifunctional composite modified masterbatch.

Example 2

(1) Preparation of a Composition A Including a Far-Infrared Negative Ion-Carried PET Resin:

55 g of PET powder, 35 g of m-phenylenediamine, and 10 g of acetone were mixed to obtain a mixture a.

A stone needle-tourmaline mixed powder b with a particle size of 1 μm or less in which a mass ratio of a stone needle powder to a tourmaline powder was 1:1 was prepared by using an ultrafine pulverizer.

8.25 g of the mixed powder b was weighed and fed together with the mixture a into a mixing device to obtain a homogeneous mixed slurry c, and the homogeneous mixed slurry c was discharged, stirred at a heating temperature of 90 °C to obtain a concentrated slurry with a volume of 50% of an original volume. The concentrated slurry was subjected to vacuum filtration to obtain a filter cake with a functional component content of 15%, and the filter cake was washed and dried to obtain the composition A for later use.

(2) Preparation of a Surface-Modified Nano-Copper Powder B:

110 g of a nano-copper powder was fed into a high-speed kneading machine with a temperature set as 80 °C and a rotational speed set as 500 r/min, and 5.5 g of A171 (vinyltrimethoxysilane) was added through a metering device; the temperature was adjusted to 20 °C and the rotational speed was adjusted to 1,500 r/min, and high-speed mixing was conducted for 1 h; and then the rotational speed was reduced to 500 r/min, the mixing was continued for another 1 h, and a product was discharged.

(3) Preparation of a PET Resin C with a Compound Flame-Retardant Function:

3 g of diantimony trioxide and 3 g of dibromomethane dispersed in water were ball-milled to obtain a ball-milled material, the ball-milled material was centrifuged at a rotational speed of 3,500 r/min, and then dried to obtain an antimony-halogen composite flame-retardant core material.

The core material was mixed with 18 g of hydrated zinc borate, an excess amount of absolute ethanol was added, and a resulting system was subjected to reaction overnight at 50 °C to obtain a reaction product; and the reaction product was centrifuged, and then dried to obtain an intermediate.

The intermediate was added to 300 mL of an aqueous solution of sodium dodecyl sulfate heated at 60 °C, and stirred at a rotational speed of 2,000 r/min for 20 min for emulsification to obtain an emulsion. 100 mL of ethanol was added to the emulsion, and 4.79 g of ethyl silicate was added dropwise to obtain a mixture; a pH of the mixture was measured and adjusted to 11, the heating was stopped, and the mixture was naturally cooled to room temperature to obtain a cooled mixture; and the cooled mixture was centrifuged, and then dried to obtain a flame-retardant microcapsule for later use.

6 g of the flame-retardant microcapsule, 4 g of aluminum hydroxide, 4 g of whitened red phosphorus, and 86 g of PET resin were fed into a mixing device, mixed to be uniform, and discharged to obtain the PET resin C with a compound flame-retardant function.

(4) Preparation of a Multifunctional Composite Modified Masterbatch:

60 g of the composition A, 60 g of the surface-modified nano-copper powder B, 120 g of the PET resin C, and 138 g of PET resin were fed into a twin-screw extruder, subjected to extrusion granulation at a processing temperature of 250 °C, and a resulting material was dried to obtain the multifunctional composite modified masterbatch.

Example 3

(1) Preparation of a Composition a Including a Far-Infrared Negative Ion-Carried PA6 Resin:

55 g of PA6, 30 g of aminoethylpiperazine, and 15 g of ethylene glycol were mixed to obtain a mixture a.

A stone needle-tourmaline mixed powder b with a particle size of 1 μm or less in which a mass ratio of a stone needle powder to a tourmaline powder was 1:1 was prepared by using an ultrafine pulverizer.

11 g of the mixed powder b was weighed and fed together with the mixture a into a first mixing device to obtain a homogeneous mixed slurry c, and the homogeneous mixed slurry c was discharged, stirred at a heating temperature of 90 °C to obtain a concentrated slurry with a volume of 50% of an original volume. The concentrated slurry was subjected to vacuum filtration to obtain a filter cake with a functional component content of 20%, and the filter cake was washed and dried for later use.

(2) Preparation of a Surface-Modified Nano-Zinc Powder B:

110 g of a nano-zinc powder was fed into a high-speed kneading machine with a temperature set as 120 °C and a rotational speed set as 500 r/min, and 5.5 g of A172 (vinyltris(β-methoxyethoxy)silane) was added through a metering device; the temperature was adjusted to 40 °C and the rotational speed was adjusted to 1,500 r/min, and high-speed mixing was conducted for 1 h; and then the rotational speed was reduced to 500 r/min, the mixing was conducted for another 1 h, and a product was discharged.

(3) Preparation of a PA6 Resin C with a Compound Flame-Retardant Function:

3 g of diantimony trioxide and 3 g of dibromomethane dispersed in water were ball-milled to obtain a ball-milled material, the ball-milled material was centrifuged at a rotational speed of 3,500 r/min, and then dried to obtain an antimony-halogen composite flame-retardant core material.

The core material was mixed with 18 g of hydrated zinc borate, an excess amount of absolute ethanol was added, and a resulting system was subjected to reaction overnight at 50 °C to obtain a reaction product; and the reaction product was centrifuged, and dried to obtain an intermediate.

The intermediate was added to 360 mL of an aqueous solution of sodium dodecyl sulfate heated at 60 °C, and stirred at a rotational speed of 2,000 r/min for 20 min for emulsification to obtain an emulsion. Ethanol was added at a mass of ⅓ a mass of the emulsion to the emulsion, and 120 mL of ethyl silicate was added dropwise to obtain a mixture; a pH of the mixture was measured and adjusted to 11, the heating was stopped, and the mixture was naturally cooled to room temperature to obtain a cooled mixture; and the cooled mixture was centrifuged, and dried to obtain a flame-retardant microcapsule for later use.

6 g of the flame-retardant microcapsule, 3 g of aluminum hydroxide, 3 g of whitened red phosphorus, and 88 g of PA6 resin were fed into a mixing device, mixed to be uniform, and discharged to obtain the PA6 resin C with a compound flame-retardant function.

(4) Preparation of a Multifunctional Composite Modified Masterbatch:

60 g of the composition A, 60 g of the surface-modified nano-zinc powder B, 120 g of the PA6 resin C, and 138 g of a PA6 resin were fed into a twin-screw extruder, subjected to extrusion and granulation at a processing temperature of 240 °C, and a resulting material was dried to obtain the multifunctional composite modified masterbatch.

Example 4

Based on the melt-spinning technique, functional fibers were prepared by using the multifunctional composite modified masterbatch of Examples 1 to 3. Specifically, 5 g of the multifunctional composite modified masterbatch according to Example 1 was mixed with 95 g of phenolic resin, 5 g of the multifunctional composite modified masterbatch according to Example 2 was mixed with 95 g of PET resin, and 5 g of the multifunctional composite modified masterbatch according to Example 3 was mixed with 95 g of PA6 resin. Resulting homogeneous mixed materials each were dried at 100 °C to a moisture content of less than or equal to 3%, subjected to melt-spinning, and then cured and crosslinked to obtain three fiber samples 4-1, 4-2, and 4-3 corresponding to Examples 1 to 3, respectively.

Example 5

Three fiber samples were prepared according to the method in Example 4 and further woven into fabrics 5-1, 5-2, and 5-3, respectively.

Example 6

Based on the melt-spinning technique, five masterbatch samples each with a mass of 5 g were randomly selected from Example 1 and prepared into functional fibers. Specifically, five masterbatch samples of Example 1 were mixed with five phenolic resin samples each of 95 g, respectively, and resulting five homogeneous mixed materials each were dried at 100 °C to a moisture content of less than or equal to 3%, subjected to melt-spinning, and cured and crosslinked to obtain five fiber samples 6-1, 6-2, 6-3, 6-4, and 6-5, respectively.

Test Example 1

With reference to part 3 of evaluation of an antibacterial activity of a textile in GB/T 20944.3-2008, *Staphylococcus aureus* was used to characterize antibacterial activities of fabrics 5-1, 5-2, and 5-3 in Example 5. Characterization data are shown in Table 1, and it can be seen that the fabrics prepared from the composite masterbatch of the present disclosure have excellent antibacterial activities.

TABLE 1

| | Bacteriostasis rate/% | GB/T 20944.3-2008 |
|---|---|---|
| 5-1 | 99 | ≥70% |
| 5-2 | 98 | |
| 5-3 | 99 | |

Test Example 2

According to the thin material vertical burning test in the test standard UL94 Tests for Flammability of Plastic Materials for Parts in Devices and Appliances (UL94-VTM), flame-retardant grades of the fabrics 5-1, 5-2, and 5-3 in Example 5 were evaluated. A flame was applied for the first time with a flame height controlled at 20 mm, and after the flame was removed, and a flame combustion time $t_1$ was recorded; and a flame was applied for 3 s for the second time, and after the flame was removed, a flame combustion time $t_2$ and a flameless combustion time $t_3$ were recorded, and whether a 125 mm maker was exceeded and whether there was a droplet to ignite an absorbent cotton below were recorded. Evaluation data are shown in Table 2, and it can be seen that the flame-retardant grades of the fabrics of the examples all can be determined as VTM-0, and the fabrics are not much different from each other in terms of combustion time data and exhibit stable flame-retardant performance.

TABLE 2

| | UL94-VTM | | | | | |
|---|---|---|---|---|---|---|
| | Thickness/μm | $t_1$/S | $t_2$/S | Whether a droplet drops | Whether a droplet ignites an absorbent cotton | Grade |
| 5-1 | 30 | 5.2 | 5.9 | No | No | VTM-0 |
| 5-2 | 32 | 5.6 | 5.3 | No | No | VTM-0 |
| 5-3 | 31 | 5.4 | 5.2 | No | No | VTM-0 |

Test Example 3

With reference to detection and evaluation of far-infrared performance of textiles in GB/T 30127-2013 standard, the far-infrared emission rate and temperature rise indexes of fabrics were evaluated, and according to the standard, the fiber samples 4-1, 4-2, and 4-3 in Example 4 each were subjected to a far-infrared emission rate test and a temperature rise test. Test results are shown in Table 3, and it can be seen that a minimum far-infrared emission rate is 0.95 and a minimum temperature rise is 3.2 °C, which far exceeds the requirements in the standard and indicates excellent far-infrared emission health-care performance.

TABLE 3

| | Far-infrared emission rate | | Temperature rise/° C. | |
|---|---|---|---|---|
| | Test result | Requirement in GB/T 30127-2013 | Test result | Requirement in GB/T 30127-2013 |
| 4-1 | 0.98 | ≥0.88 | 3.9 | ≥1.4 |
| 4-2 | 0.99 | | 3.8 | |
| 4-3 | 0.95 | | 3.2 | |

The far-infrared performance of the fiber samples 6-1, 6-2, 6-3, 6-4, and 6-5 in Example 6 was tested by the same method. Test results are shown in Table 4, and it can be seen that the fiber samples in the same example are not much different from each other in terms of far-infrared performance, indicating that functional components are well dispersed in the samples.

TABLE 4

| | Far-infrared emission rate | | Temperature rise/° C. | |
|---|---|---|---|---|
| | Test result | Requirement in GB/T 30127-2013 | Test result | Requirement in GB/T 30127-2013 |
| 6-1 | 0.98 | ≥0.88 | 3.9 | ≥1.4 |
| 6-2 | 0.97 | | 3.8 | |
| 6-3 | 0.99 | | 3.9 | |
| 6-4 | 0.98 | | 4.0 | |
| 6-5 | 0.99 | | 3.9 | |

Test Example 5

With reference to detection and evaluation of a negative ion output of a textile in GB/T 30128-2013 standard, negative ion outputs of the fabrics were evaluated, and according to the standard, negative ion outputs of the fabric samples 6-1, 6-2, 6-3, 6-4, and 6-5 in Example 6 were tested. Test data is shown in Table 5, and it can be seen that the fabric samples prepared by the method of the present disclosure have a negative ion output far exceeding a standard requirement and are in a range of 1,550 to 1,650. The stable data further indicates that functional components are well dispersed in the masterbatch.

TABLE 5

| | 6-1 | 6-2 | 6-3 | 6-4 | 6-5 |
|---|---|---|---|---|---|
| Negative ion output (ions/$cm^3$) | 1558 | 1596 | 1621 | 1587 | 1633 |
| Requirement in GB/T 30128-2013 | >1,000 indicates a high negative ion output 550-1,000 indicates a medium negative ion output <550 indicates a relatively-low negative ion output | | | | |

The above are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for preparing a multifunctional composite modified masterbatch, comprising the following steps:

(1) preparation of a composition A comprising a far-infrared negative ion-carried carrier resin: mixing a carrier resin, a curing agent, and a solvent to be uniform to obtain a mixture a; preparing a stone needle-tourmaline mixed powder b with a particle size of 1 μm or less by using an ultrafine pulverizer; feeding the mixture a and the stone needle-tourmaline mixed powder b into a mixing device to obtain a homogeneous mixed slurry c; discharging and stirring the homogeneous mixed slurry c at a heating temperature of 50 °C to 110 °C to obtain a concentrated slurry with a volume of 50% of an original volume; and subjecting the concentrated slurry to vacuum filtration to obtain a filter cake with a functional component content of 10% to 20%, and washing and drying the filter cake to obtain the composition A for later use;

(2) preparation of a surface-modified antibacterial nano-powder B: feeding an antibacterial nano-powder with a particle size of 10 nm to 100 nm into a high-speed kneading machine with a temperature set as 70 °C to 120 °C and a rotational speed set as 500 r/min, and adding a surface modifier at an amount of 5 wt % of the antibacterial nano-powder by a metering device; adjusting the temperature to 20 °C to 40 °C and the rotational speed to 1,500 r/min, and conducting high-speed mixing for 1 h; and reducing the rotational speed to 500 r/min, continuing mixing for another 1 h, and discharging to obtain the surface-modified antibacterial nano-powder B, wherein the antibacterial nano-powder with the particle size of 10 nm to 100 nm is one selected from the group consisting of nano-silver, nano-copper, and nano-zinc and the surface modifier is selected from the group consisting of vinyltriethoxysilane, vinyltrimethoxysilane, and vinyltris (β-methoxyethoxy) silane;

(3) preparation of a compound resin C with a compound flame-retardant function: mixing a flame-retardant microcapsule, a flame-retardant agent, and a carrier resin to be uniform in a mixing device, and discharging to obtain the compound resin C, wherein the flame-retardant microcapsule comprises diantimony trioxide, hydrated zinc borate, and dibromomethane in a mass ratio of 1:6:1; the flame-retardant agent comprises aluminum hydroxide and whitened red phosphorus in a mass ratio of 4:3; and in the compound resin C, a ratio of a total mass of the flame-retardant microcapsule and the flame-retardant agent to a mass of the carrier resin is in a range of 2:23 to 4:21; and (4) feeding the composition A, the antibacterial nano-powder B, the compound resin C, and a carrier resin into a twin-screw extruder according to a mass ratio of 10:10:20:23, and conducting extrusion and granulation at a processing temperature of 150 °C to 250 °C to obtain the multifunctional composite modified masterbatch with a functional component content of 10% to 20%.

2. The method of claim 1, wherein in step (1), a weight percentage of the carrier resin in the mixture a is in a range of 50 wt % to 60 wt %.

3. The method of claim 1, wherein in step (1), the solvent is one selected from the group consisting of acetic acid, acetone, and ethylene glycol, and a weight percentage of the solvent in the mixture a is in a range of 30 wt % to 40 wt %.

4. The method of claim 1, wherein in step (1), the curing agent is one selected from the group consisting of diethylenetriamine, m-phenylenediamine, and aminoethylpiperazine, and a weight percentage of the curing agent in the mixture a is in a range of 1 wt % to 3 wt %.

5. The method of claim 1, wherein in step (1), a mixing bin of the mixing device comprises a base plate and a side wall in a shape of conus coaxial with the base plate; a feed port of the mixing bin of the mixing device is formed at a bottom of the side wall and is externally connected to a feed pipe provided with a feed valve and a booster pump; and a discharge port of the mixing bin of the mixing device is formed at a top of the side wall and is externally connected to a discharge pipe provided with a discharge valve.

6. The method of claim 1, wherein in step (3), the flame-retardant microcapsule is prepared by a process comprising the following steps:

ball-milling the diantimony trioxide and the dibromomethane in a mass ratio of 1:1 dispersed in water to obtain a ball-milled material, centrifuging the ball-milled material, and drying a centrifuged material to obtain an antimony-halogen composite flame-retardant core material for later use;

mixing the antimony-halogen composite flame-retardant core material with the hydrated zinc borate in a mass ratio of 1:3, adding absolute ethanol, and conducting reaction overnight at 50 °C to obtain a reaction product; centrifuging the reaction product, and drying a centrifuged product to obtain a hydrated zinc borate-coated core material, which is denoted as a microcapsule intermediate;

heating an aqueous solution of sodium dodecyl sulfate at 60 °C until the sodium dodecyl sulfate is dissolved, adding the microcapsule intermediate and stirring at a rotational speed of 2,000 r/min for 20 min for emulsification to obtain an emulsion;

adding ethanol at a mass of ⅓ of a mass of the emulsion to the emulsion, and adding ethyl silicate dropwise with a molar ratio of the ethyl silicate to the hydrated zinc borate being 1:3 to obtain a mixture; measuring and adjusting a pH of the mixture to 11, stopping the heating, and naturally cooling to room temperature to obtain a cooled mixture; and centrifuging the cooled mixture, and drying a centrifuged mixture to obtain the flame-retardant microcapsule.

7. The method of claim 1, wherein in steps (1), (3), and (4), the carrier resin is one selected from the group consisting of phenolic resin, polypropylene (PP), polyamide 6 (PA6), polyamide 66 (PA66), polyethylene terephthalate (PET), polyvinyl acetal, and polyurethane (PU), and a same carrier resin is used in steps (1), (3), and (4).

8. The method of claim 2, wherein in step (1), the solvent is one selected from the group consisting of acetic acid, acetone, and ethylene glycol, and a weight percentage of the solvent in the mixture a is in a range of 30 wt % to 40 wt %.

9. The method of claim 2, wherein in step (1), the curing agent is one selected from the group consisting of diethylenetriamine, m-phenylenediamine, and aminoethylpiperazine, and a weight percentage of the curing agent in the mixture a is in a range of 1 wt % to 3 wt %.

* * * * *